United States Patent [19]

Parker

[11] Patent Number: 4,971,752
[45] Date of Patent: Nov. 20, 1990

[54] SAFETY DESIGN FOR NUCLEAR POWER PLANTS

[76] Inventor: Louis W. Parker, 2040 N. Dixie Hwy., Fort Lauderdale, Fla. 33305

[21] Appl. No.: 465,518

[22] Filed: Jan. 17, 1990

Related U.S. Application Data

[63] Continuation-in-part of Ser. No. 284,228, Dec. 14, 1988, abandoned.

[51] Int. Cl.$^5$ .............................................. G21C 13/10
[52] U.S. Cl. .................................... 376/274; 376/272; 376/288; 376/309
[58] Field of Search ............................. 376/272–276, 376/287, 288, 283, 284, 309, 914; 252/626, 628, 633; 405/128

[56] References Cited

U.S. PATENT DOCUMENTS

| | | | |
|---|---|---|---|
| 3,755,076 | 8/1973 | Lindsley | 376/273 |
| 3,755,079 | 8/1973 | Weinstein et al. | 376/273 |
| 4,146,429 | 3/1979 | Slagley | 376/280 |
| 4,244,153 | 1/1981 | Schwarzer et al. | 376/273 |
| 4,257,912 | 3/1981 | Fleischer et al. | 376/272 |
| 4,297,167 | 10/1981 | Schabert | 376/273 |
| 4,483,790 | 11/1984 | Gaiser | 376/273 |
| 4,851,183 | 7/1989 | Hampel | 376/274 |

OTHER PUBLICATIONS

"Underground Siting of Nuclear Power Reactors", Karpenko et al, 10/74, pp. 1–22.

Primary Examiner—Daniel D. Wasil
Attorney, Agent, or Firm—Pollock, VandeSande and Priddy

[57] ABSTRACT

A nuclear power plant installation comprises a nuclear reactor that is disposed in an underground reactor room and connected to power generating equipment on the ground surface by pipes which pass between the underground reactor room and the ground surface. A plurality of underground cavities are disposed above the underground reactor room, each of said cavities comprising steel bridgework that defines the sides and tops of the cavity and an unreinforced concrete floor which supports a mass of particulate shielding material within the cavity. An explosive charge embedded within each such mass may be detonated in the event of a malfunction of the reactor to fracture the floor structure in the cavity if the floor has not been fractured by the reactor malfunction, thereby to cause tons of mixed sand and boron powder to fall from said cavities into the reactor room and bury the malfunctioning reactor within a few seconds after the explosion. The installation also includes one or more underground personnel rooms which are connected to the underground reactor room by horizontal tunnels that contain normally open doors which are automatically closed in the event of an explosion in the reactor room.

22 Claims, 3 Drawing Sheets

SAFETY DESIGN FOR NUCLEAR POWER PLANTS

This application is a continuation-in-part, of S.N. 284,228, filed on Dec. 14, 1988, now abandoned.

FIELD OF THE INVENTION

The present invention relates to a nuclear power plant installation that comprise a reactor disposed in an underground room, and is more particularly concerned with an installation which increases the safety of operation of such a nuclear power plant by automatically burying the reactor in a mass of particulate shielding material in case of a serious reactor breakdown or explosion in the reactor room.

The invention can also be used to eliminate the remains of a defective or dangerous atomic reactor, or to safely dispose of a reactor at the end of its operational life.

BACKGROUND OF THE INVENTION

The smallest breach of a primary reactor system has the potential of causing major problems. The water and steam associated with the reactor carry radioactive materials which are very hazardous to human health. Atomic bomb type explosions are not possible because there is not enough plutonium or other fissionable material in the reactor to cause such an explosion.

The primary purpose of the invention is to isolate the troubled area in a few seconds either automatically or with human intervention. To accomplish this, large quantities of sand and boron powder are placed above the area to be protected and upon occurrence of an emergency, e.g., an explosion in the reactor room gravity is used to deliver these substances into the endangered area in less than five seconds. Provision is made to delay this delivery for a few seconds if human life is endangered, but it can only be held up for a few predetermined seconds. After this, the equipment starts its operation automatically.

It has been suggested heretofore that protection from undesirable radiation can be obtained by locating the reactor room underground, with some of the power generating equipment that is associated with the reactor being located on the ground surface and connected to the reactor by pipes which pass from the ground surface to the underground reactor room. One such arrangement is disclosed, for example, in Lindsley U.S. Pat. No. 3,755,076 issued Aug. 28, 1973, for "Nuclear Powered Energy Conversion System". Another arrangement which employs an underground reactor is disclosed in Schabert U.S. Pat. No. 4,297,167 issued Oct. 27, 1981, for "Nuclear Reactor Installation". Gaiser U.S. Pat. No. 4,483,790 issued Nov. 20, 1984, describes methods for disposing of a shut-down above-ground nuclear reactor by encapsulating the reactor, sinking the encapsulated reactor into an underground pit, and then covering the sunken reactor with earth.

While the foregoing references rely upon the provision of a body of earth between an underground chamber and the ground surface to provide a radiation shield, they do not provide the level of protection which is truly necessary to protect persons from radiation contamination or pollution in the event of a serious accident. In the Lindsley system, for example, the underground reactor chamber communicates with the earth surface via one or more open vertical conduits through which radiation can pass to the earth surface in the event of an accident such as an earthquake, or a reactor explosion; and no provision is made for automatically covering in a few seconds the regions through which such contamination may emanate in the event of such an accident. The present invention is intended to obviate these defects in the prior art by means of a nuclear power plant installation design which provides increased safety.

SUMMARY OF THE INVENTION

In accordance with the present invention, an underground reactor room is connected with surface equipment by means of heat insulated pipes which are covered with removable steel panels that keep the pipes intact in the case of an emergency. Underground personnel rooms are provided at the level of the reactor room, and one or more elevators carry personnel and materials between the reactor room and areas that are far enough away from each other to minimize damage to life and property in the case of a serious emergency. The elevator shafts are made wide enough to contain the pipes which connect the reactor room with steam turbines or the like located at the ground surface. Tunnels connect the underground reactor room with the elevators and personnel rooms, and these tunnels are provided with several doors that automatically close to isolate the reactor room from the elevator shafts and from the outside world when necessary.

A plurality of underground cavities are disposed in superposed relation to one another above the underground room in which the reactor is located, and each of these cavities contains a large quantity of mixed sand and boron powder, or other suitable inert particulate shielding material, that is supported on a frangible floor structure in the cavity. An explosion in the underground reactor room operates, in addition to automatically closing the aforementioned tunnel doors, to fracture the cavity floors so as to cause the inert particulate material within each cavity to fall into the underground reactor room and to bury the reactor therein. Explosive charges are also located at strategic points in or adjacent to the superposed cavities to release the mixtures of boron powder and sand into the reactor room if such release does not occur as a result of the reactor malfunction itself.

The installation of the present invention also facilitates disposal of a nuclear reactor that has become defective, or dangerous, or is no longer desired to remain in operation for any other reason. Under such circumstances the aforementioned explosive charges can be intentionally detonated by appropriate supervisory personnel to dump the mixtures of sand and boron power stored in the underground cavities into the reactor room thereby to permanently bury the reactor or any remains thereof in the underground reactor room.

BRIEF DESCRIPTION OF THE DRAWINGS

The foregoing construction and operation of the present invention will become more readily apparent from the following description and accompanying drawings wherein.

DESCRIPTION OF THE PREFERRED EMBODIMENTS

Figure 1:
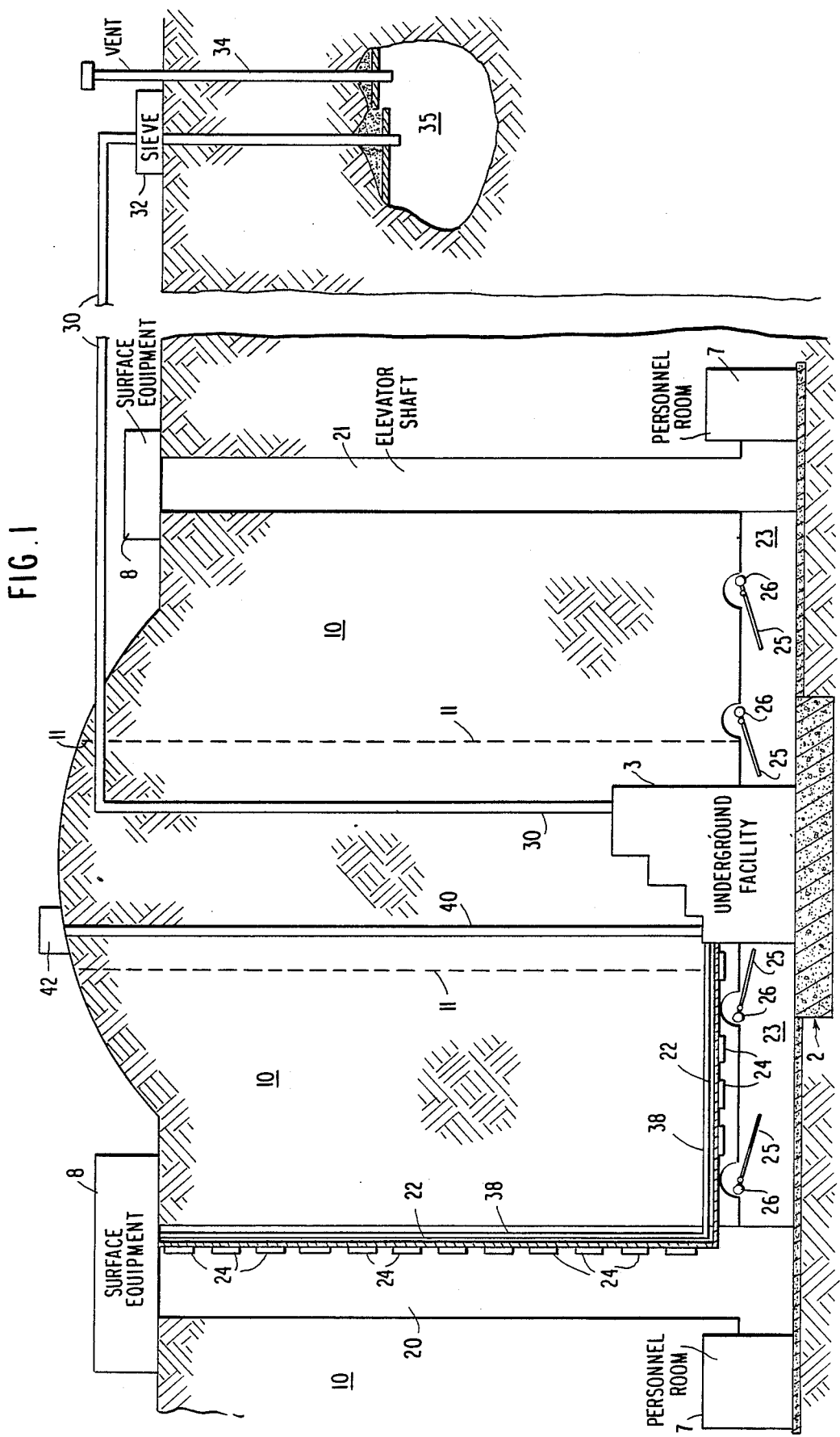
FIG. 1 is a diagrammatic cross section of a nuclear power plant installation constructed in accordance with the present invention.

As shown in FIG. 1, the nuclear power plant installation of the present invention comprises an underground facility 3 that is located at the bottom of an excavated cavity 11 in ground 10, the facility being supported upon a concrete foundation 2. Underground facility 3 will be described in greater detail subsequently by reference to FIG. 2, and consists of an underground chamber 15 or reactor room in which a nuclear reactor is located, and a plurality of underground cavities that are preferably disposed in superposed relation to one another above the underground reactor room. The underground facility 3 is preferably located at least 100 feet below the ground surface so that earth 10 between the facility 3 and the ground surface shields above ground personnel and equipment from radiation emanating from the reactor.

One or more personnel rooms 7 are also located underground at substantially the level of the chamber which contains the nuclear reactor, and these personnel rooms are connected to the underground facility 3 by substantially horizontal tunnels 23, and are connected to the earth surface by elevator shafts 20 and 21. Power generating equipment such as steam turbines, electric generators, steam condensers, electric transformers and the like are located in surface equipment rooms 8 that are disposed adjacent the top of each of the elevator shafts 20 and 21, and the equipment in the rooms 8 is connected to the reactor in the underground facility by heat insulated steam pipes 22 which extend horizontally along the top of the tunnels 23 and vertically through the elevator shafts. Connecting pipes 22 are covered by steel panels 24 which protect the steam pipes 22 from damage and which isolate steam in the pipes from the elevator shafts 20, 21 and from horizontal tunnels 23 if any such pipe should rupture.

The underground facility 3, horizontal tunnels 23 and personnel rooms 7 are ventilated by a ventilation system consisting of a blower 42 that is located at or above the ground surface and connected to the underground facility by an air intake duct system diagrammatically represented by pipe 40. The ventilation system also includes an air exhaust duct system 30 which includes a first duct section that extends upwardly and then horizontally through a sieve 32 to an underground chamber 35, and a second duct section 34 that extends from underground chamber 35 to an air vent located at or above the ground surface.

Automatic doors 25 are provided in the tunnels 23 to isolate the underground facility 3 from the personnel rooms 7, the elevator shafts 20, 21, and personnel and equipment at the ground surface in the event of an emergency. Doors 25 are mounted for pivotal motion on horizontal supports and are normally partially open as shown in FIG. 1. Each door is substantially balanced to its partially open position by a weight 26 that is located on the side of the pivot opposite door 25, and the orientation of each such door 25 relative to its pivot and relative to the underground facility 3 is such that, if an explosion should occur in the underground facility 3, the resulting rush of air from the underground facility into the tunnels 23 will swing the several doors 25 into their closed position. The doors can also be operated manually by any suitable mechanical means. In addition, the weight-balanced doors 25 can be moved to a full open horizontal position manually to provide a greater vertical height within the tunnels 23 to facilitate movement of equipment or personnel through the tunnels 23. Such manual operation is desirable to assure that the door remains in a fully open horizontal position only while it is held in that position by a person in the tunnel 23. It is also advisable to have more than one door 25 in each of tunnels 23 to assure complete isolation of the reactor in underground facility 3 from the personnel rooms and elevator shafts if one door in any such tunnel becomes inoperative for any reason.

Figure 2:
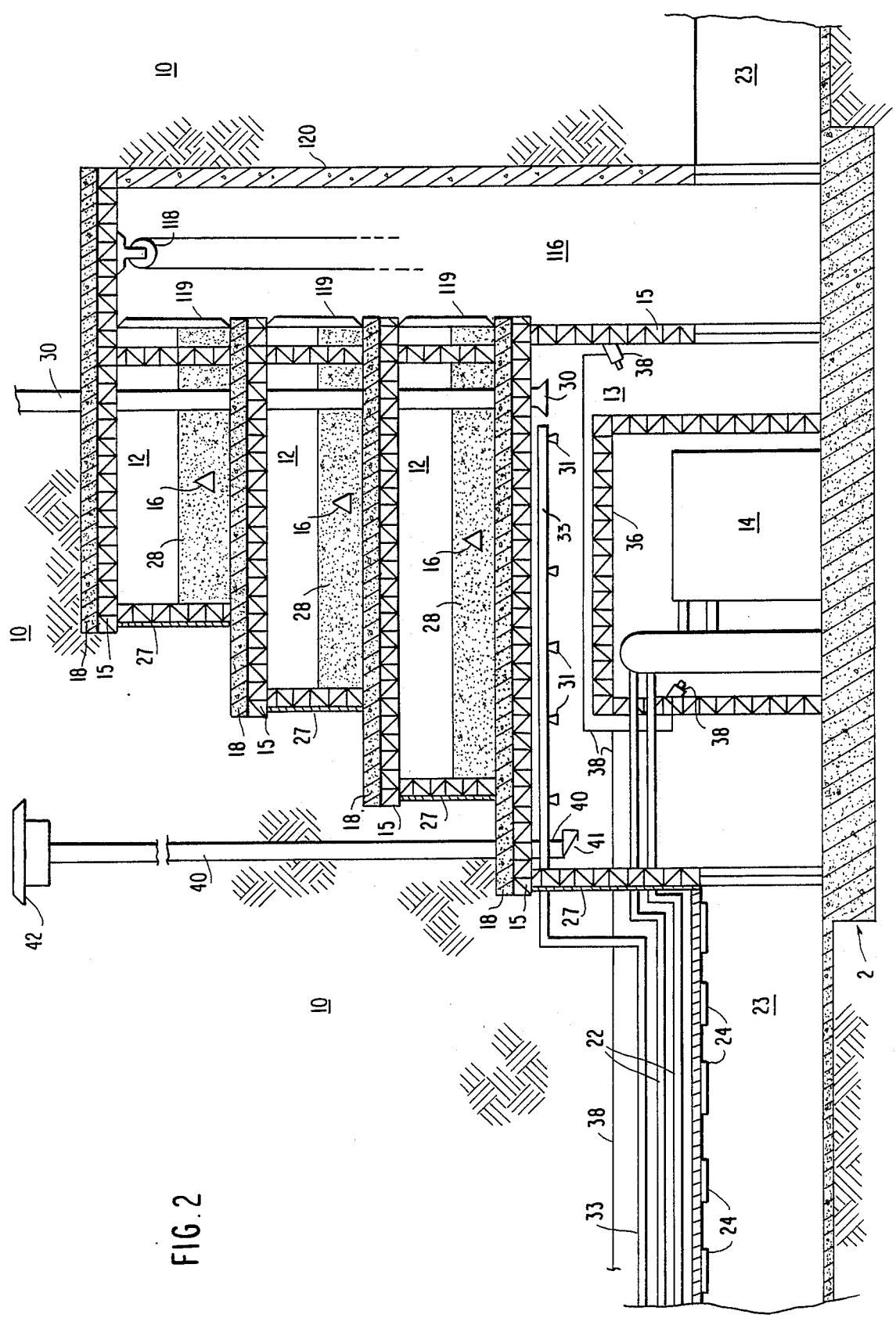
FIG. 2 illustrates in greater detail a portion of the installation shown in FIG. 1, namely the underground room in which the reactor is located and the associated superposed underground cavities.

The underground facility 3 is shown in greater detail in FIG. 2. It comprises an underground chamber 13 in which reactor 14 is located. A plurality of smaller cavities 12 are located above main chamber 13, with each such smaller cavity including an unreinforced concrete floor 18. Steel bridgework 15 defines the sides and top of each such underground cavity 12 as well as the sides and top of the main underground chamber or reactor room 13. Those portions of steel bridgework 15 which define the sides of chamber 13 and cavities 12 are covered with copper sheet 27.

The space within each of underground cavities 12 is filled substantially halfway with a mass of inert particulate shielding material 28, preferably consisting of a mixture of sand and boron powder. In addition, an explosive charge 16 is associated with each of the underground cavities 12, e.g., embedded in the sand/boron powder mixture 28 within the cavity 12. Each of the underground cavities 12 includes an access door 119 that is disposed adjacent a shaft 116 that runs vertically between the bottom and top of the underground facility 3. Shaft 116 is normally empty, but is equipped at its top with a pulley 118 which can be used to elevate personnel or materials to any selected one or more of the access doors 119. Doors 119 are normally closed, and are used to gain access to the interior of cavities 12 only in the case of an emergency. A concrete wall 120 defines the side of shaft 116 opposite to access doors 119.

A sprinkler system 31 is located within and adjacent the top of reactor room 13, and the sprinkler system 31 is connected via a piping system 33 to a water tank located high above the ground surface which supplies water under pressure to the sprinkler system. Sprinkler system 31 can be used to extinguish any fire which might occur in the reactor room, and may also be used in the manner which will be described hereinafter to clear debris from the reactor room 13 following a reactor malfunction or accident.

Inasmuch as the concrete slabs 18 forming the floor structures of the several underground cavities 12 are constructed without reinforcing rods, the said floor structures will fracture or fall apart comparatively easily as a result of forces exerted thereon by an explosion in reactor room 13, thereby causing the sand and boron powder mixtures 28 to fall under the influence of gravity from cavities 12 into reactor room 13 to bury the reactor 14. An iron grating 36 surrounds the sides and top of the reactor 14 to protect the reactor 14 from falling pieces of concrete. If the force of an explosion occurring in reactor room 13 is insufficient to fracture the concrete slabs 18, the explosive charges 16 can be detonated to disintegrate the slabs 18 and thereby cause the sand and boron powder mixtures 28 to dump into reactor room 13 around and above reactor 14 so as to almost fill reactor room 13.

Figure 3:
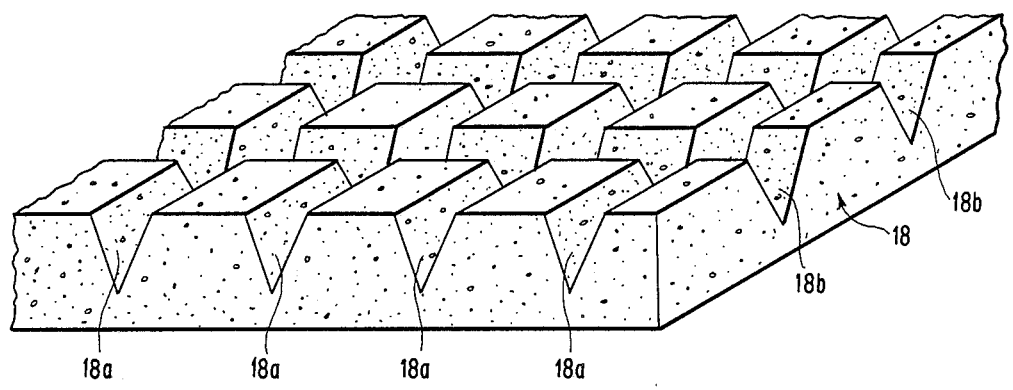
FIG. 3 illustrates the preferred construction of the concrete floors provided in the superposed underground cavities.

As shown in FIG. 3, each of the concrete slabs 18 forming the floor structures of underground cavities 12 is preferably provided with deep V-shaped grooves 18a and 18b that extend across and into the slab 18 in respectively transverse intersecting relation to one another, to increase the frangibility of the slab. Upon occurrence of an explosion in the reactor room and/or when the explosive charges 16 are intentionally detonated, the provision of such grooves causes the entire slab to break into numerous comparatively small pieces thereby assuring that all of the sand and boron powder mixture stored in the associated underground cavity 12 will be released from said cavity and dumped under the influence of gravity into reactor room 13.

Following an event which causes the burying of reactor 14 in the manner described above, the reactor room can be cleared of the resultant debris at an appropriate later time by activating the sprinkler system 31. The mud that is produced can be washed out of the reactor room 13 via duct system 30, and passes into underground cavity 35 through sieve 32 which retains solid material above a certain size. The mud within reactor room 13 is prevented from passing into air intake system 40 by a one-way flow valve 41 that is located at the outlet end of system 40. Several television cameras 38 are preferably installed in or adjacent to reactor room 13 to permit the reactor 14 to be seen from a control room on the ground surface under normal operating conditions, and to permit the interior of the reactor room 13 to be observed following the burying of the reactor, and during any subsequent cleaning operation.

The duct system 30 preferably comprises comparatively large diameter pipes, e.g., 12 inches in diameter or greater, and can be used to effect removal of mud and equipment from the cleared reactor room 13 following an explosion or other damage.

There are several cavities 12 contained particulate; each is smaller than the one below it. The purpose of this is to use only as much of the particulate material as seems necessary.

An electric alarm system is necessary to alert the personnel and to make explosive charges 16 detonate when required, but this is not included in the invention.

The overall installation can be constructed by a procedure generally as follows:

1. A hole 11 is initially excavated in ground 10 to a depth of at least 100 feet, the excavated material being piled above ground around the cavity so formed.
2. The concrete foundation 2 is then built.
3. Steel bridgework 15 is thereafter erected on concrete foundation 2 to define the underground reactor room 13 and those regions of the excavation which will be used to form underground cavities 12.
4. The unreinforced concrete slabs 18 are constructed to form the floor of each cavity.
5. An explosive charge 16 is placed on each concrete slab 18, and electrical cables are attached to each such charge 16 and let out of the excavation to an appropriate control location.
6. A deep layer of sand and boron mixture 28 is then piled on each concrete slab 18.
7. Steel bridgework 15 is faced with copper sheet 27.
8. Horizontal tunnels 23 and elevator shafts 20 and 21 are then constructed.
9. Rooms 7 are constructed to house operating personnel.
10. The excavated material 11 on the ground surface is piled back into the excavation outside of and around copper sheets 27 and tunnels 23.

While I have thus described a preferred embodiment of the present invention, many variations will be apparent to those skilled in the art. It must therefore be understood that the foregoing description is intended to be illustrative only and not limitative of the present invention, and all such modifications and variations as are in accord with the principles described are meant to fall within the scope of the appended claims.

Having thus described my invention I claim:

1. A nuclear power plant installation comprising a nuclear reactor disposed in an underground reactor room that is separated from the ground surface by an intervening body of earth which shields aboveground personnel and equipment from radiation emanating from said reactor, said installation including power generating equipment that is located on the ground surface and connected to said reactor by pipes which pass from the ground surface to said underground reactor room, supplemental shielding means that is automatically operable immediately following occurrence of an emergency in said reactor room, said supplemental shielding means comprising a plurality of underground cavities disposed above the underground room in which said reactor is located, each of said cavities having a frangible floor structure which supports a mass of inert particulate shielding material within said cavity, and an explosive charge adjacent each such cavity which may be detonated upon occurrence of said emergency to fracture said floor structure if said floor structure has not been fractured by the events that have given rise to said emergency, the fracturing of said floor structures being operable to cause the inert particulate material within those cavities whose floors have been fractured to fall under the influence of gravity into said underground reactor room from said cavities above said reactor room so as to bury said reactor in a mass of said particulate material.

2. The nuclear power plant installation of claim 1 wherein the frangible floor structure in each of said cavities is fabricated of unreinforced concrete.

3. The nuclear power plant installation of claim 1 wherein said plurality of underground cavities are of different sizes and disposed in superposed relation to one another.

4. The nuclear power plant installation of claim 1 wherein said inert particulate shielding material comprises a mixture of sand and boron powder.

5. The nuclear power plant installation of claim 4 wherein the explosive charge associated with each of said cavities is embedded in the mixture of sand and boron powder within said cavity.

6. The nuclear power plant installation of claim 1 wherein the sides and top of each of said underground cavities are defined by steel bridgework, each of said underground cavities including an access door through which personnel may enter said cavity.

7. The nuclear power plant installation of claim 1 including at least one underground personnel room located substantially at the level of said underground reactor room in spaced relation to said reactor room, and an underground tunnel which extends between said personnel room and said reactor room.

8. The nuclear power plant installation of claim 7 wherein said supplemental shielding means includes a plurality of doors that are disposed in said tunnel in spaced relation to one another between said personnel room and said underground reactor room for closing said tunnel.

9. The nuclear power plant installation of claim 8 wherein said doors are normally at least partially open, each of said doors being mounted for pivotal motion to a closed position about a horizontal axis that is located adjacent a roof of said tunnel, the orientation and direction of pivoting of said doors being such that a rush of air into said tunnel resulting from an explosion in said underground reactor room causes said doors to pivot automatically into their closed positions.

10. The nuclear power plant installation of claim 8 including an elevator shaft extending downwardly from the ground surface to said horizontal underground tunnel, said elevator shaft being so located that it is isolated from said underground reactor room when said doors are closed.

11. The nuclear power plant installation of claim 1 including a ventilation system extending between said ground surface and said underground reactor room, said ventilation system including an air blower located at said ground surface and connected to said underground reactor room by an air intake duct system, and an air exhaust duct system extending between said underground reactor room and an air vent located at said ground surface.

12. The nuclear power plant installation of claim 11 wherein said air intake duct system includes a one-way air flow valve.

13. The nuclear power plant installation of claim 1 wherein a duct system is provided which includes a first duct section that extends between said underground reactor room and a remote underground chamber, means for transporting materials from said reactor room to said underground chamber via said first duct section, a sieve in said first duct section which limits the size of solid materials transported via said first duct section into said underground chamber, and said duct system including a second duct section which extends between said underground chamber and an air vent.

14. The nuclear power plant installation of claim 1 including a water sprinkler system in said underground reactor room, said sprinkler system being connected by pipes extending to a source of water under pressure located above the ground surface.

15. The nuclear power plant installation of claim 1 including a video camera located adjacent said underground reactor room to permit personnel on the ground surface to view the interior of said reactor room.

16. The nuclear power plant installation of claim 1 including means for removing particulate material from said reactor room after said emergency has terminated, said last named means comprising means for supplying water under pressure to said reactor room, and a duct system leading from said reactor room to a remote underground cavity for transporting water and particulate material out of said reactor room to said remote cavity.

17. The nuclear power plant installation of claim 1 wherein the frangible floor structure in each of said underground cavities is a concrete slab having a plurality of grooves therein to increase the frangibility of said slab.

18. The nuclear power plant installation of claim 17 wherein said plurality of grooves include two groups of grooves that are disposed in transverse intersecting relation to one another.

19. The nuclear power plant installation of claim 18 wherein each of said grooves in V-shaped in cross section.

20. A nuclear power plant installation comprising a nuclear reactor disposed in an underground reactor room that is separated from the ground surface by an intervening body of earth which shields aboveground personnel and equipment from radiation emanating from said reactor, said installation including power generating equipment that is located on the ground surface and connected to said reactor by pipes which pass from the ground surface to said underground reactor room, supplemental shielding means comprising a plurality of underground cavities disposed in superposed relation to one another above said underground reactor room, each of said underground cavities having a frangible floor structure which supports a mass of inert particulate shielding material within said cavity, an explosive charge adjacent each such cavity, and means for selectively detonating said charges to fracture said floor structures thereby to cause the inert particulate material within those cavities whose floors have been fractured to fall under the influence of gravity into said underground reactor room from said cavities above said reactor room so as to bury said reactor in a mass of said particulate material.

21. The nuclear power plant installation of claim 20 wherein said superposed underground cavities are of different sizes and are disposed in staggered relation to one another.

22. The nuclear power plant installation of claim 20 wherein the frangible floor structure in each of said underground cavities has a plurality of grooves therein disposed in transverse intersecting relation to one another to increase the frangibility of said floor structure.

* * * * *